US012589884B2

(12) United States Patent
Romani de Oliveira et al.

(10) Patent No.: US 12,589,884 B2
(45) Date of Patent: Mar. 31, 2026

(54) AIRCRAFT CONTROL SYSTEM FAILURE EVENT SEARCH

(71) Applicant: The Boeing Company, Arlington, VA (US)

(72) Inventors: Ítalo Romani de Oliveira, São José dos Campos (BR); Alejandro Torres Gámiz, Madrid (ES); Thiago Toshio Matsumoto, Taubate (BR)

(73) Assignee: The Boeing Company, Arlington, VA (US)

( * ) Notice: Subject to any disclaimer, the term of this patent is extended or adjusted under 35 U.S.C. 154(b) by 176 days.

(21) Appl. No.: 18/463,188

(22) Filed: Sep. 7, 2023

(65) Prior Publication Data

US 2025/0083834 A1      Mar. 13, 2025

(51) Int. Cl.
B64D 45/00          (2006.01)

(52) U.S. Cl.
CPC ...... B64D 45/00 (2013.01); B64D 2045/0085 (2013.01)

(58) Field of Classification Search
CPC ...................... B64D 45/00; B64D 2045/0085
See application file for complete search history.

(56) References Cited

U.S. PATENT DOCUMENTS

| | | | |
|---|---|---|---|
| 9,928,131 B2 | 3/2018 | Romani de Oliveira | |
| 2006/0007184 A1* | 1/2006 | Rosenberg ............. | G01B 21/04 345/173 |

| | | | |
|---|---|---|---|
| 2009/0300418 A1* | 12/2009 | Klein .................... | G06F 11/008 714/E11.029 |
| 2013/0166271 A1* | 6/2013 | Danielsson ......... | G06F 11/3698 703/22 |
| 2014/0080099 A1* | 3/2014 | Sowadski ................ | G09B 9/54 434/37 |

(Continued)

OTHER PUBLICATIONS

A Review of Tracking, Prediction and Decision Making Methods for Autonomous Driving Florin Leon, Marius Gavrilescu "Gheorghe Asachi" Technical University of Iasi, Romania (Year: 2019).*

(Continued)

*Primary Examiner* — Donald J Wallace
*Assistant Examiner* — Jalal C Coduroglu
(74) *Attorney, Agent, or Firm* — Alleman Hall LLP

(57)          ABSTRACT

A computing device including a processor configured to receive a specification of a search space over inputs to an aircraft control system. The processor is further configured to perform a Monte Carlo tree search (MCTS) to identify an adversarial branch of the search space. The MCTS includes, in each of a plurality of partitioning steps, computing discrete branches of the search space by computing sample values of a partitioning objective function, estimating a probability density function of the objective function, and partitioning a current-iteration portion of the search space based on the probability density function. The discrete branches each include event nodes that have corresponding estimated event probabilities. The MCTS further includes, at a multi-agent system model including supervised learning models, recomputing the estimated event probabilities and the current-iteration portion of the search space. The processor is further configured to generate and output a graphical representation of the adversarial branch.

20 Claims, 11 Drawing Sheets

(56) References Cited

U.S. PATENT DOCUMENTS

| | | | |
|---|---|---|---|
| 2015/0019187 A1* | 1/2015 | Jones | G06F 30/20 |
| | | | 703/8 |
| 2015/0301878 A1* | 10/2015 | Chen | G06F 11/3676 |
| | | | 714/48 |
| 2017/0177426 A1* | 6/2017 | Romani de Oliveira | |
| | | | G06F 17/13 |
| 2018/0300317 A1* | 10/2018 | Bradbury | G06N 3/08 |
| 2019/0258559 A1* | 8/2019 | Higashiyama | G06F 11/3058 |
| 2020/0012551 A1* | 1/2020 | Liang | G06F 16/2455 |
| 2020/0302339 A1* | 9/2020 | Nadamuni Raghavan | |
| | | | G06N 20/00 |
| 2022/0066853 A1* | 3/2022 | He | G06F 11/0709 |
| 2023/0064846 A1* | 3/2023 | Morioka | G06F 16/2228 |
| 2023/0078803 A1* | 3/2023 | Wiegman | G05B 13/04 |
| | | | 701/3 |

OTHER PUBLICATIONS

Baier, H. et al., "The Power of Forgetting: Improving the Last-Good-Reply Policy in Monte Carlo Go," IEEE Transactions on Computational Intelligence and AI in Games, vol. 2, No. 4, Dec. 20, 2010, 7 pages.
Browne, C. et al., "A Survey of Monte Carlo Tree Search Methods," IEEE Transactions on Computational Intelligence and AI in Games, vol. 4, No. 1, Feb. 3, 2012, 49 pages.
EmbraerX et al., "Flight Plan 2030," May 28, 2019, 48 pages.
European Organisation for the Safety of Air Navigation, "TLS Apportionment Method," Edition V0.7, Jul. 30, 2003, 62 pages.

Federal Aviation Administration, "Urban Air Mobility Concept of Operations," Version 1.0, Jun. 26, 2020, 49 pages.
Hsieh, C. et al., "Unmanned Air-Traffc Management (UTM): Formalization, a Prototype Implementation, Verification, and Performance Evaluation," arXiv:2009.04655v2, Dec. 18, 2020, 21 pages.
Lee, R. et al., "Adaptive Stress Testing: Finding Likely Failure Events with Reinforcement Learning," arXiv:1811.02188v3, Dec. 4, 2020, 37 pages.
Lee, R. et al., "Adaptive Stress Testing of Airborne Collision Avoidance Systems," Proceedings of IEEE/AIAA 34th Digital Avionics Systems Conference, Sep. 16, 2015, Prague, Czech Republic, 24 pages.
Leveson, N., "A New Accident Model for Engineering Safer Systems," Proceedings of Massachusetts Institute of Technology Engineering Systems Division Coloquium, May 29, 2002, Cambridge, MA, 26 pages.
Romani De Oliveira, Í et al., "A Method for Estimating the Probability of Extremely Rare Accidents in Complex Systems," IEEE Transactions on Reliability, vol. 68, No. 2, Jun. 2019, 18 pages.
Stefanski, J. et al., "TDOA versus ATDOA for wide area multilateration system," EURASIP Journal on Wireless Communications and Networking, 2018 article 179, Jul. 16, 2018, 13 pages.
Stroeve, S. et al., "Contrasting safety assessments of a runway incursion scenario: Event sequence analysis versus multi-agent dynamic risk modelling," Reliability Engineering and System Safety, vol. 109, Aug. 3, 2012, 17 pages.
The Assurance Case Working Group, "Goal Structuring Notation Community Standard," Version 2, Jan. 2018, 82 pages.

\* cited by examiner

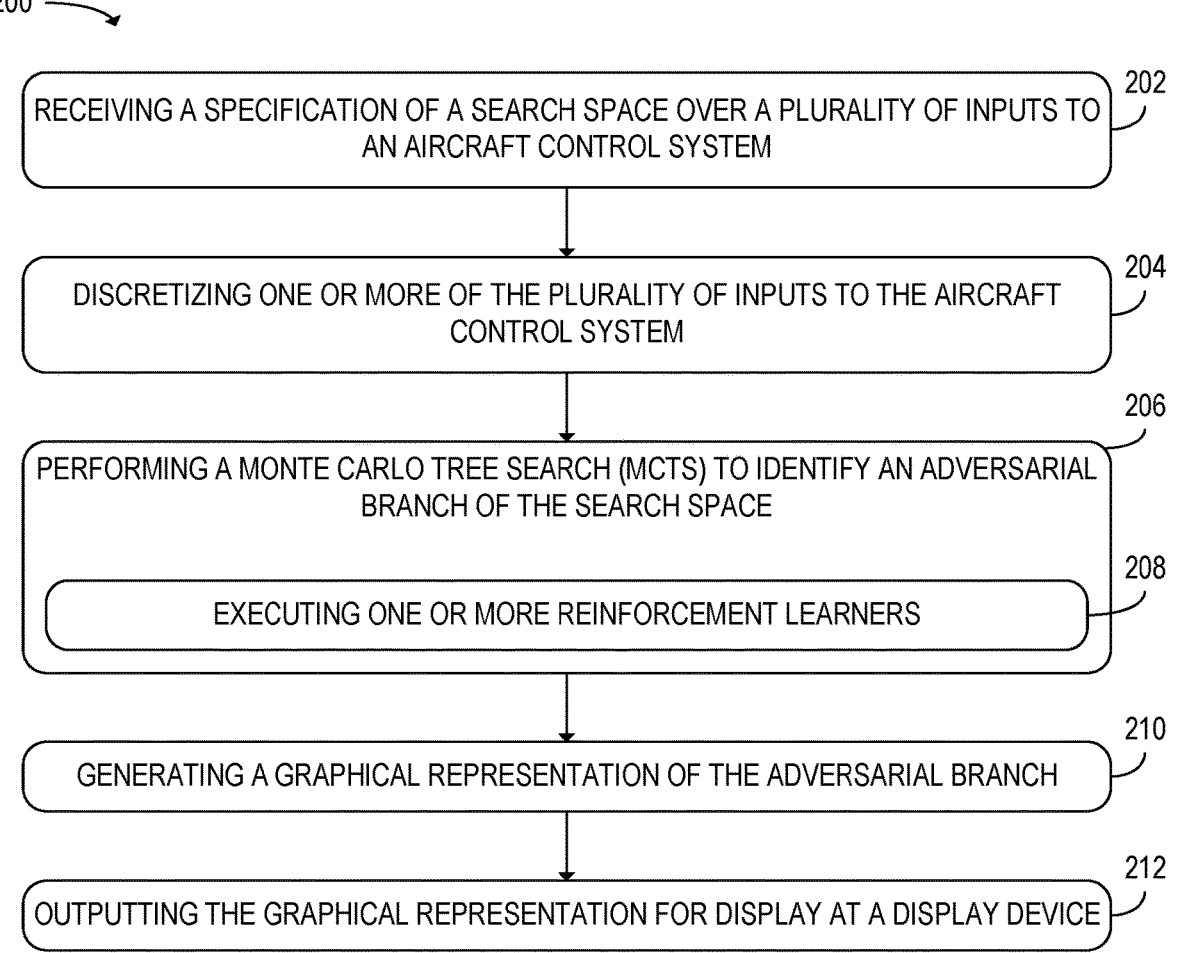

200

202
RECEIVING A SPECIFICATION OF A SEARCH SPACE OVER A PLURALITY OF INPUTS TO AN AIRCRAFT CONTROL SYSTEM

204
DISCRETIZING ONE OR MORE OF THE PLURALITY OF INPUTS TO THE AIRCRAFT CONTROL SYSTEM

206
PERFORMING A MONTE CARLO TREE SEARCH (MCTS) TO IDENTIFY AN ADVERSARIAL BRANCH OF THE SEARCH SPACE

208
EXECUTING ONE OR MORE REINFORCEMENT LEARNERS

210
GENERATING A GRAPHICAL REPRESENTATION OF THE ADVERSARIAL BRANCH

212
OUTPUTTING THE GRAPHICAL REPRESENTATION FOR DISPLAY AT A DISPLAY DEVICE

FIG. 6A

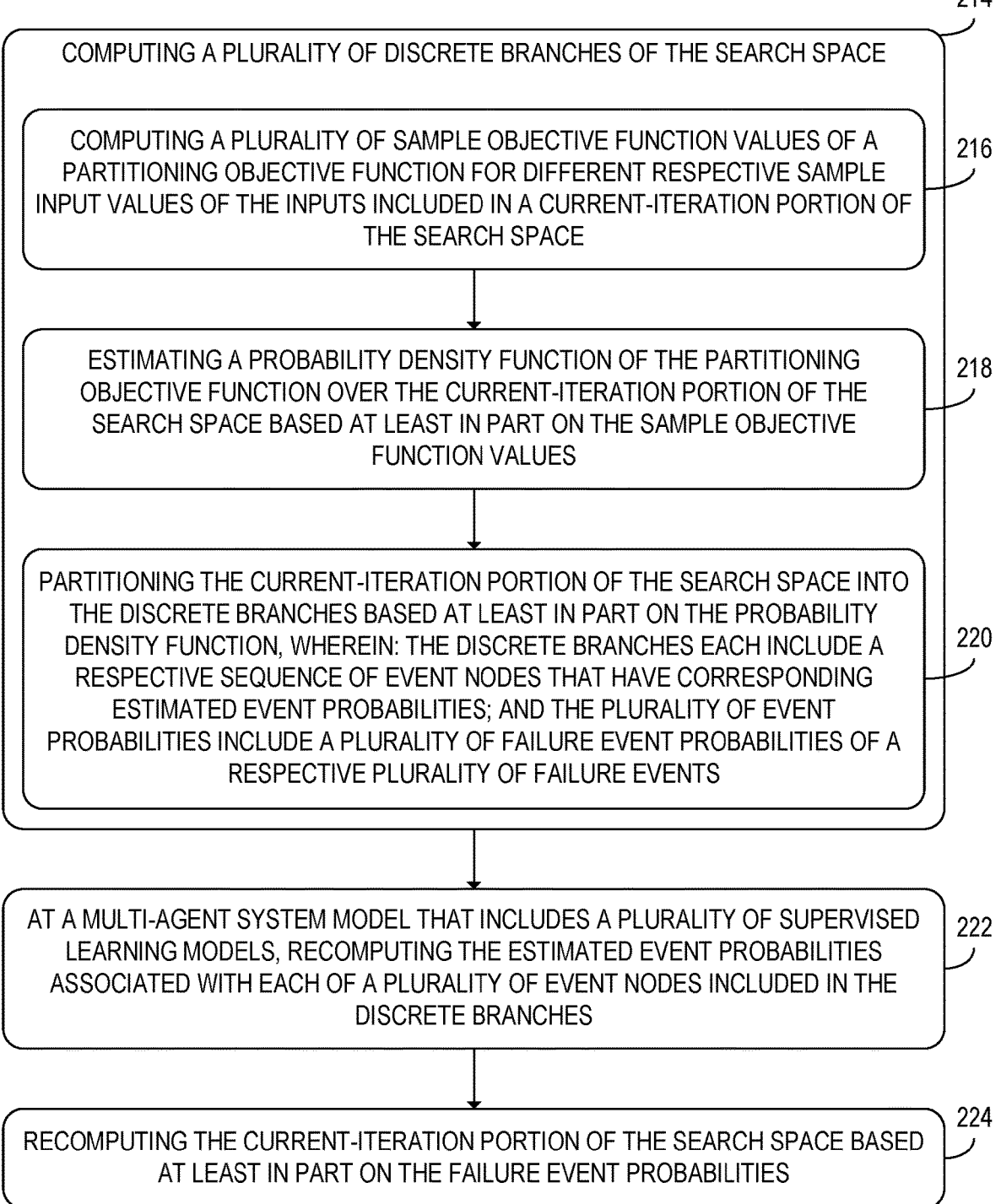

214

COMPUTING A PLURALITY OF DISCRETE BRANCHES OF THE SEARCH SPACE

COMPUTING A PLURALITY OF SAMPLE OBJECTIVE FUNCTION VALUES OF A PARTITIONING OBJECTIVE FUNCTION FOR DIFFERENT RESPECTIVE SAMPLE INPUT VALUES OF THE INPUTS INCLUDED IN A CURRENT-ITERATION PORTION OF THE SEARCH SPACE

216

ESTIMATING A PROBABILITY DENSITY FUNCTION OF THE PARTITIONING OBJECTIVE FUNCTION OVER THE CURRENT-ITERATION PORTION OF THE SEARCH SPACE BASED AT LEAST IN PART ON THE SAMPLE OBJECTIVE FUNCTION VALUES

218

PARTITIONING THE CURRENT-ITERATION PORTION OF THE SEARCH SPACE INTO THE DISCRETE BRANCHES BASED AT LEAST IN PART ON THE PROBABILITY DENSITY FUNCTION, WHEREIN: THE DISCRETE BRANCHES EACH INCLUDE A RESPECTIVE SEQUENCE OF EVENT NODES THAT HAVE CORRESPONDING ESTIMATED EVENT PROBABILITIES; AND THE PLURALITY OF EVENT PROBABILITIES INCLUDE A PLURALITY OF FAILURE EVENT PROBABILITIES OF A RESPECTIVE PLURALITY OF FAILURE EVENTS

220

AT A MULTI-AGENT SYSTEM MODEL THAT INCLUDES A PLURALITY OF SUPERVISED LEARNING MODELS, RECOMPUTING THE ESTIMATED EVENT PROBABILITIES ASSOCIATED WITH EACH OF A PLURALITY OF EVENT NODES INCLUDED IN THE DISCRETE BRANCHES

222

RECOMPUTING THE CURRENT-ITERATION PORTION OF THE SEARCH SPACE BASED AT LEAST IN PART ON THE FAILURE EVENT PROBABILITIES

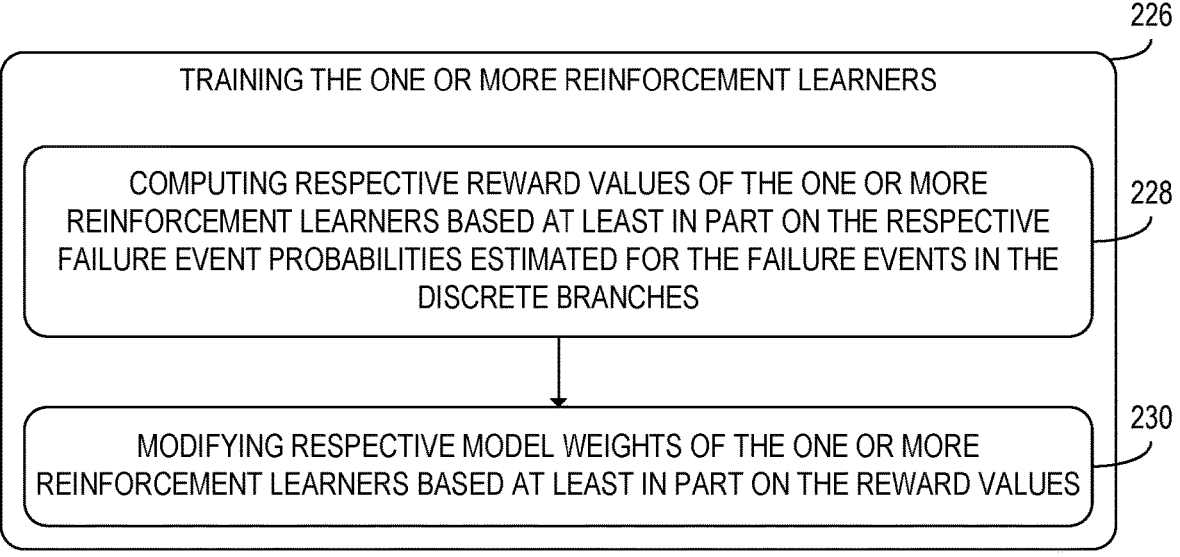

TRAINING THE ONE OR MORE REINFORCEMENT LEARNERS

228

COMPUTING RESPECTIVE REWARD VALUES OF THE ONE OR MORE REINFORCEMENT LEARNERS BASED AT LEAST IN PART ON THE RESPECTIVE FAILURE EVENT PROBABILITIES ESTIMATED FOR THE FAILURE EVENTS IN THE DISCRETE BRANCHES

230

MODIFYING RESPECTIVE MODEL WEIGHTS OF THE ONE OR MORE REINFORCEMENT LEARNERS BASED AT LEAST IN PART ON THE REWARD VALUES

FIG. 6C

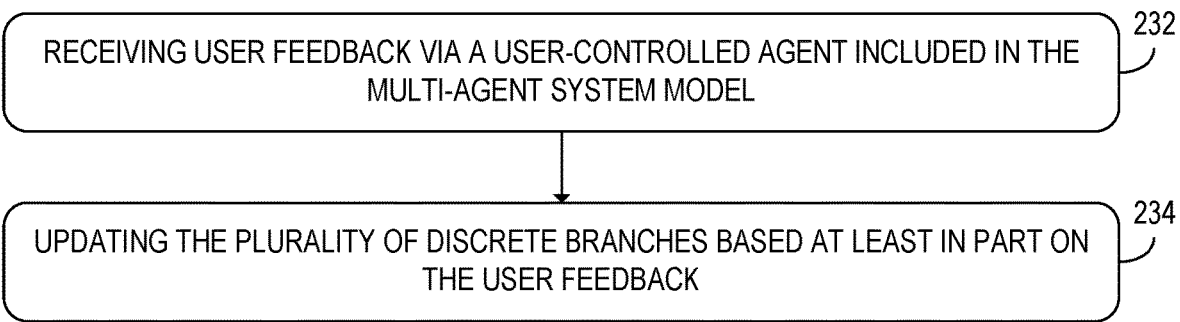

232

RECEIVING USER FEEDBACK VIA A USER-CONTROLLED AGENT INCLUDED IN THE MULTI-AGENT SYSTEM MODEL

234

UPDATING THE PLURALITY OF DISCRETE BRANCHES BASED AT LEAST IN PART ON THE USER FEEDBACK

FIG. 6D

AIRCRAFT CONTROL SYSTEM FAILURE EVENT SEARCH

FIELD

This application pertains generally to aircraft safety assessment and pertains more specifically to estimation of failure event probabilities for an aircraft control system.

BACKGROUND

In aircraft operation, risks of rare but potentially catastrophic failure events are present. Aircraft are also complex systems that include large numbers of components and include both automated subsystems and human-controlled subsystems. Accordingly, simulations of aircraft and aircraft operation have been developed in order to assess the probabilities of failure events and allow failure risk reduction strategies to be identified. Such models are used, for example, during aircraft design and during training of personnel such as pilots and air traffic controllers.

SUMMARY

According to one aspect of the present disclosure, a computing device is provided, including a processor configured to receive a specification of a search space over a plurality of inputs to an aircraft control system. The processor is further configured to perform a Monte Carlo tree search (MCTS) to identify an adversarial branch of the search space. Performing the MCTS includes, in each of a plurality of partitioning steps, computing a plurality of discrete branches of the search space at least in part by computing a plurality of sample objective function values of a partitioning objective function for different respective sample input values of the inputs included in a current-iteration portion of the search space. Computing the discrete branches further includes estimating a probability density function of the partitioning objective function over the current-iteration portion of the search space based at least in part on the sample objective function values. Computing the discrete branches further includes partitioning the current-iteration portion of the search space into the discrete branches based at least in part on the probability density function. The discrete branches each include a respective sequence of event nodes that have corresponding estimated event probabilities. The plurality of event probabilities include a plurality of failure event probabilities of a respective plurality of failure events. Performing the MCTS further includes, at a multi-agent system model that includes a plurality of supervised learning models, recomputing the estimated event probabilities. Performing the MCTS further includes recomputing the current-iteration portion of the search space based at least in part on the failure event probabilities. The processor is further configured to generate a graphical representation of the adversarial branch and output the graphical representation for display at a display device.

BRIEF DESCRIPTION OF THE DRAWINGS

FIG. 6A schematically shows a flowchart of a method for use with a computing device to estimate the probabilities of failure events, according to the example of FIG. 1.

FIG. 6B shows additional steps of the method of FIG. 6A that are performed during a Monte Carlo tree search.

FIG. 6C shows additional steps of the method of FIG. 6A that are performed to train a plurality of reinforcement learners.

FIG. 6D shows additional steps of the method of FIG. 6A that are performed when user feedback is received at the multi-agent system model.

DETAILED DESCRIPTION

Several approaches to hazard identification have previously been used in aircraft design and personnel training. Examples of these approaches include Goal Structuring Notation (GSN), Bow-tie Models, Markov Analysis, Failure Model and Effects Analysis (FMEA), Systems-Theoretic Accident Model and Processes (STAMP), Systems-Theoretic Process Analysis (STPA), and Functional Hazard Assessment (FHA). However, many of these previous approaches rely on manual construction of sequences of events that may lead to failures. Thus, such approaches are frequently unsuitable for hazard assessment in systems such as aircraft in which failure events sometimes involve interactions between large numbers of components. In addition, many of these previous hazard identification approaches are qualitative and do not provide probability estimates for failure events.

Since aircraft operation involves time-sensitive tasks, especially during emergency scenarios, incorporation of real-time user feedback into a hazard assessment model would be useful both in operator training and in testing of aircraft control system designs. However, in addition to the above drawbacks, none of the previous approaches listed above support automated incorporation of live feedback from users. Accordingly, use of the above approaches in real-time emergency drills or training exercises would be impractical.

The prior approaches listed above are also frequently unable to identify extremely rare failure events and the sequences of system states that lead to those failure events. For example, existing hazard assessment methods based on statistical sampling can require impractically large sample sizes (e.g., hundreds of millions of sample trajectories) to obtain, in expectation, even a single instance of some types of failure events. However, since such rare events can be among the most highly negative types of failure events (e.g., if failure event severity follows a heavy-tailed or super-heavy-tailed distribution), modeling such events is still frequently valuable despite their low probabilities.

Figure 1:
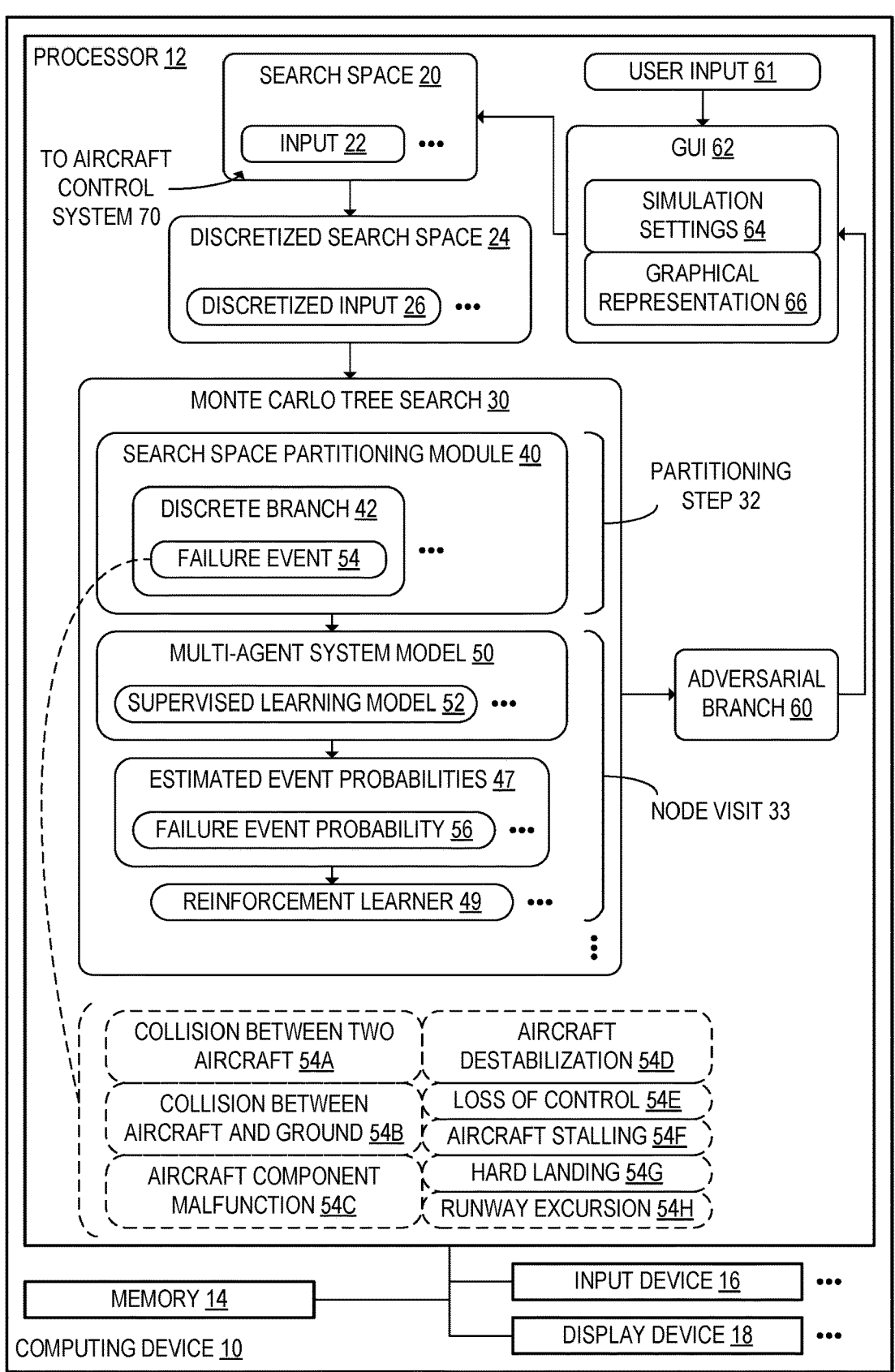
FIG. 1 schematically shows a computing device configured to perform failure event identification, according to one example embodiment.

Systems and methods are provided below that allow failure events at an aircraft to be modeled in a manner that allows for incorporation of real-time user feedback and identification of extremely rare failure events. FIG. 1 schematically shows a computing device 10 configured to perform failure event identification, according to one example embodiment. The computing device 10 shown in FIG. 1 includes a processor 12 and memory 14. The processor 12 includes one or more processing devices, such as one or more central processing units (CPUs), one or more graphics processing units (GPUs), and/or one or more other hardware accelerators. The memory 14 includes one or more memory devices, including, for example, one or more volatile memory devices and one or more non-volatile storage devices.

In some examples, the processor 12 and the memory 14 are instantiated as one or more components that combine processor and memory functionality, such as a system-on-a-chip (SoC). Additionally or alternatively, in some examples, the processor 12 and the memory 14 are distributed across a plurality of physical computing devices, such as a plurality of networked computing devices located in a data center. The plurality of physical computing devices include a server computing device and a client computing device in some examples.

The computing device 10 depicted in FIG. 1 further includes one or more input devices 16. Example input devices 16 include a keyboard, a mouse, a touchscreen, a microphone, an optical sensor, and/or a motion sensor. In some examples, as discussed in further detail below, the one or more input devices 16 include one or more aircraft control devices. The computing device 10 further includes one or more display devices 18. Output devices other than the one or more display devices 18, such as a speaker or a haptic feedback device, are also included in the computing device 10 in some examples. Using the one or more display devices 18, the computing device 10 is configured to display a graphical user interface (GUI) 62 to the user at which the processor 12 is configured to receive user input 61 via the one or more input devices 16.

When failure event identification is performed at the computing device 10, as shown in FIG. 1, the processor 12 is configured to receive a specification of a search space 20. The search space 20 is a space of a plurality of inputs 22 to an aircraft control system 70. These inputs 22 can include values of discrete variables (e.g., whether an autopilot mode is active) and continuous variables (e.g., steering angle). In some examples, the inputs 22 are the settings and quantities that are directly controlled by the aircraft operator. In other examples, the inputs 22 further include values of one or more variables that affect aircraft operation but are not directly controllable by the operator, such as an amount of fuel remaining.

Although, in the above examples, the aircraft operator is a pilot of the aircraft, actions of other personnel involved in aircraft operation are also represented in the search space 20 in some examples. For example, such personnel can include an air traffic controller and one or more ground crew members. The actions of different types of personnel are modeled jointly in some examples when performing failure event identification, as discussed in further detail below. In other examples, the actions of different types of personnel are modeled separately.

In examples in which the search space 20 includes one or more continuous-valued inputs to the aircraft control system 70, the processor 12 is further configured to discretize the one or more continuous-valued inputs 22. The processor 12 is configured to bucket values of the one or more continuous-valued inputs to compute a discretized search space 24 over a plurality of discretized inputs 26. By discretizing the one or more continuous-valued inputs, the processor 12 converts the search space 20 into a form that is expressible as a plurality of searchable branches, as discussed in further detail below.

The processor 12 is further configured to perform a Monte Carlo tree search (MCTS) 30 over the search space. MCTS is an action-space search technique that has seen widespread use in board-game- and video-game-playing artificial intelligence (AI) programs, such as AlphaGo and Leela Chess Zero. However, to adapt MCTS to the task of identifying aircraft failure events, modifications to conventional MCTS are made, as discussed below. In the MCTS 30, the processor 12 is configured to identify one or more failure events 54 along with corresponding failure event probabilities 56.

The MCTS 30 is performed over a plurality of partitioning steps 32. In each of the partitioning steps 32, the processor 12 is configured to execute a search space partitioning module 40 to compute a plurality of discrete branches 42 of the search space 20. In addition, the processor 12 is further configured to perform one or more node visits 33 as part of the MCTS 30 subsequently to each of the partitioning steps 32. The MCTS 30 performed in the example of FIG. 1 is performed to identify an adversarial branch 60 of the search space 20 in which a failure event 54 occurs at the aircraft. In some examples, as discussed in further detail below, the adversarial branch 60 has a highest failure event probability 56 among the plurality of discrete branches 42 computed in the plurality of partitioning steps 32. The adversarial branch 60 is identified in a corresponding node visit 33.

Figure 2:
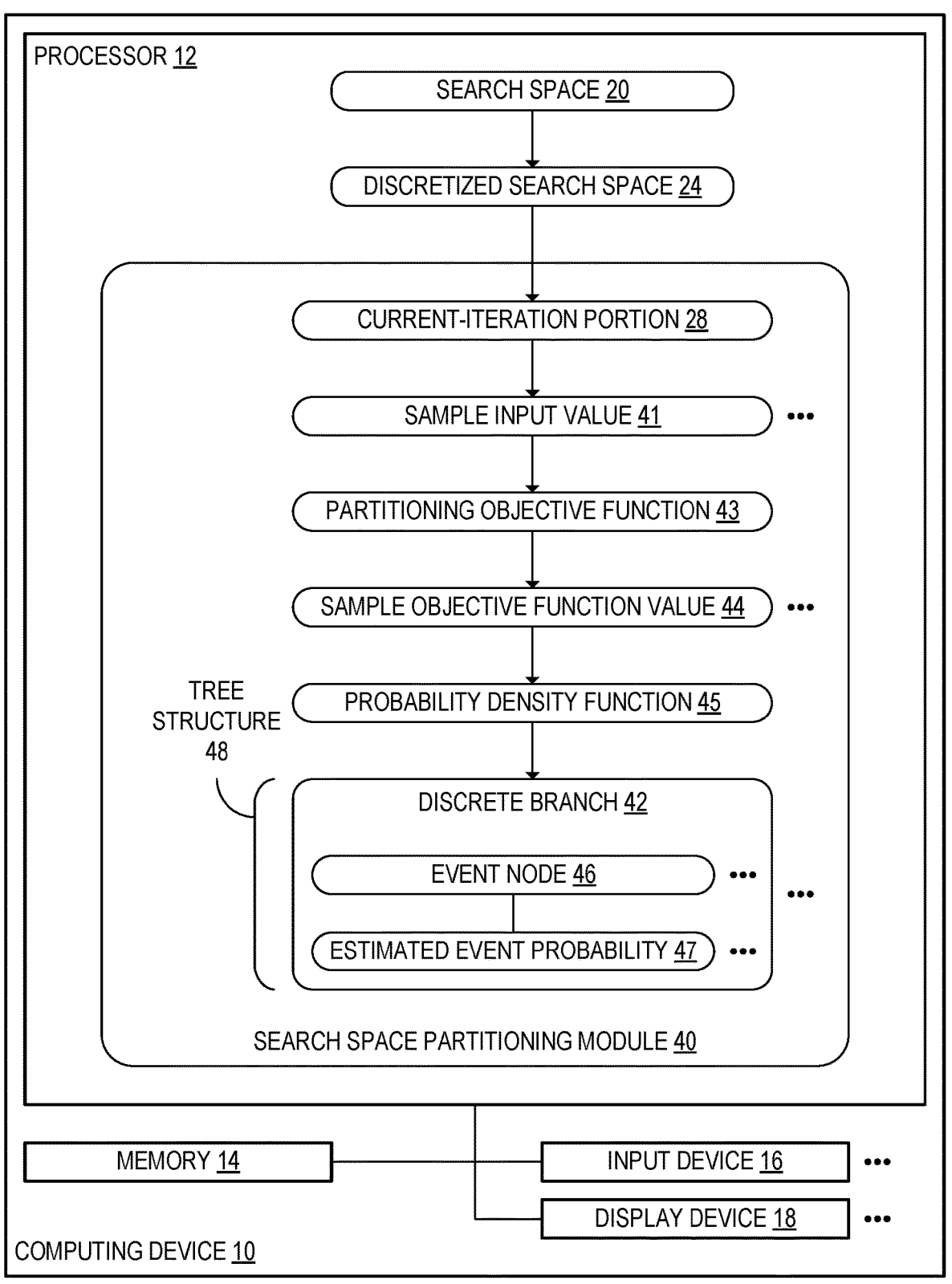
FIG. 2 schematically shows the computing device in further detail when a search space partitioning model is executed, according to the example of FIG. 1.

FIG. 2 schematically shows the computing device 10 in further detail when the search space partitioning module 40 is executed during a partitioning step 32. As shown in the example of FIG. 2, when executing the search space partitioning module 40, the processor 12 is configured to search over a current-iteration portion 28 of the discretized search space 24. The processor 12 is configured to initialize the current-iteration portion 28 as the discretized search space 24 and iteratively narrow the current-iteration portion 28 over the plurality of partitioning steps 32, as discussed in further detail below.

At the search space partitioning module 40, the processor 12 is configured to compute a plurality of sample input values 41 of the inputs 22 included in the current-iteration portion 28 of the search space 20. For example, random or pseudorandom sampling is used to select the sample input values 41. The processor 12 is further configured to input the sample input values 41 into a partitioning objective function 43 to compute a respective plurality of sample objective function values 44.

The partitioning objective function 43 used at the search space partitioning module 40 is specified by the user to select a type of failure event 54 the MCTS 30 is configured to identify. In one example, the type of failure event 54 is a midair collision between two aircraft 54A. In this example, the partitioning objective function 43 can be computed based at least in part on a miss distance between the two aircraft, which is the minimum distance separating the two aircraft along their respective trajectories. Similarly, a miss distance between an aircraft and ground can be used as an input to the partitioning objective function 43 in examples in which the failure event 54 is a collision between the aircraft and the ground 54B. In another example in which the failure event 54 is an aircraft component malfunction 54C, the partitioning objective function 43 is computed based at least in part on whether one or more aircraft components (e.g., engines or landing gear) are operational. Other types of failure events 54, such as an aircraft destabilization 54D, loss of control over the aircraft 54E, aircraft stalling 54F, a hard landing 54G, and/or a runway excursion 54H can also be identified by the MCTS 30 in some examples. The partitioning objective function 43, in some examples, includes a plurality of terms associated with different types of failure events 54.

Subsequently to computing the plurality of sample objective function values 44, the processor 12 is further configured to estimate a probability density function 45 of the partitioning objective function 43 over the current-iteration portion 28 of the search space 20 based at least in part on the sample objective function values 44. The probability density function 45 estimates the density of the sample objective function values 44 as a function of the discretized inputs 26. The processor 12 is further configured to partition the current-iteration portion 28 of the search space 20 into the discrete branches 42 based at least in part on the probability density function 45. In this partition, the density of the discrete branches 42 within the current-iteration portion 28 is proportional to the density of the sample objective function values 44.

The discrete branches 42 each include a respective sequence of event nodes 46 that have corresponding estimated event probabilities 47. In one example, an event node 46 indicates a position of an aircraft in space and time near an airport runway, along with an attitude and control system state of the aircraft and a cognitive state (e.g., distraction level) of the pilot. The event nodes 46 included in the plurality of discrete branches 42 collectively form a tree structure 48. The estimated event probability 47 of each event node 46 indicates a conditional probability of the indicated event occurring in a scenario in which the next-highest event in the tree structure 48 occurs. Thus, the child nodes that are below an event node 46 in the tree structure 48 indicate potential states of the modeled system at later times. The estimated event probabilities 47 include the failure event probabilities 56 of the plurality of failure events 54 predicted to occur at the aircraft control system 70 in a subset of the plurality of discrete branches 42.

As discussed in further detail below, in successive occurrences of the partitioning step 32, the estimated event probabilities 47 computed in each partitioning step 32 are assigned to the current event node 46, and later are propagated to parent nodes in the tree. The estimated event probabilities 47 in the partitioning steps 32 are, in some examples, received as user input or specified by historical data.

Figure 3:
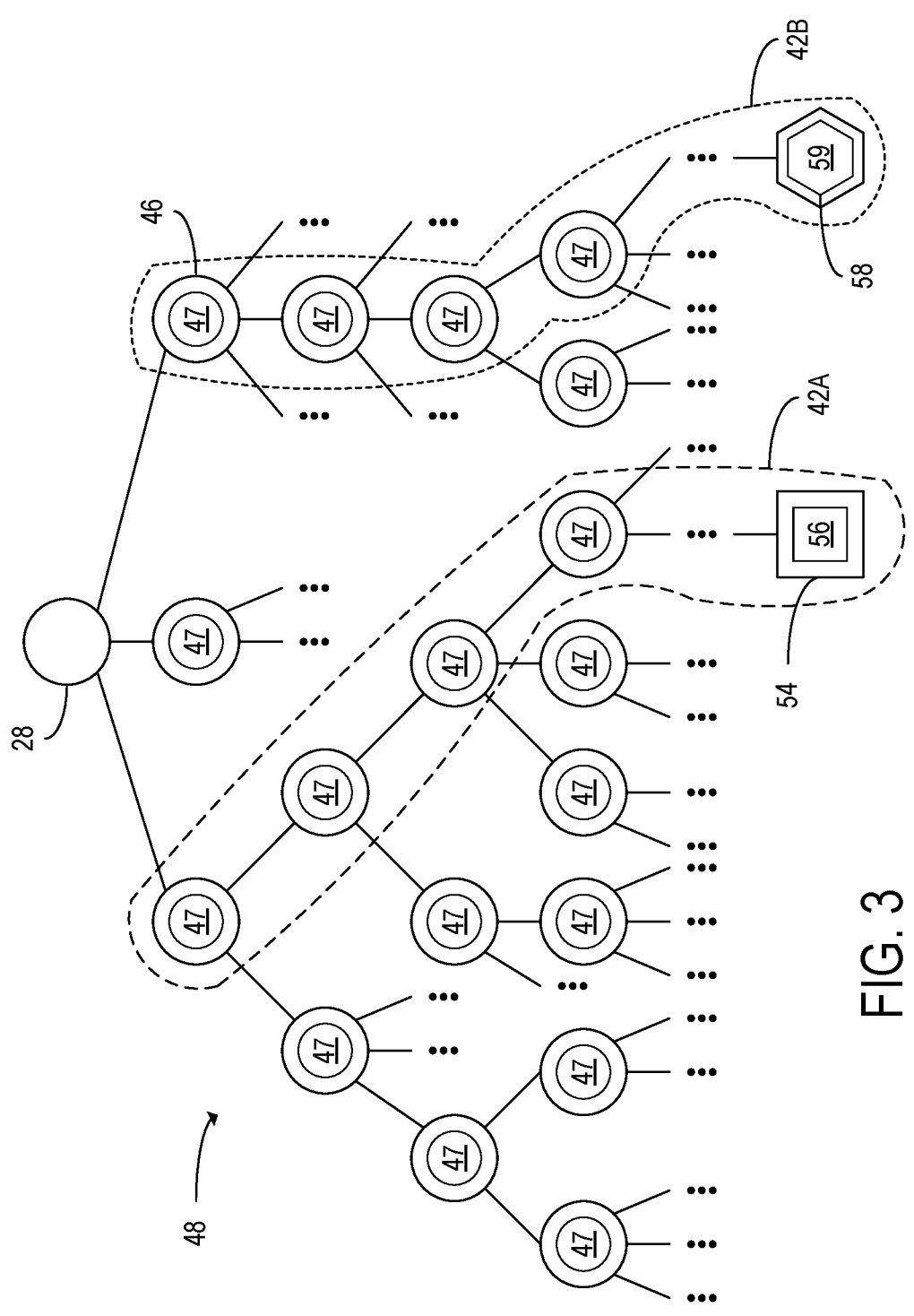
FIG. 3 schematically shows an example tree structure generated at the search space partitioning module, according to the example of FIG. 1.

FIG. 3 schematically shows an example tree structure 48 generated at the search space partitioning module 40. The plurality of discrete branches 42 included in the tree structure 48 includes a subset of discrete branches 42 that end in failure events 54 and a subset of discrete branches 42 that do not end in failure events 54. The final nodes of the discrete branches 42 that do not end in failure events 54 are indicated as success events 58. In the example of FIG. 3, a discrete branch 42A that ends in a failure event 54 is depicted, as well as a discrete branch 42B that ends in a success event 58. The respective estimated event probabilities 47 of each of the event nodes 46 are indicated in the tree structure 48, including the failure event probability 56 of the failure event 54 included in the first discrete branch 42A and the success event probability 59 of the success event 58 included in the second discrete branch 42B.

By computing the tree structure 48 of discrete branches 42 as shown in FIGS. 2 and 3, the processor 12 samples a subset of possible event sequences within the current-iteration portion 28 of the discretized search space 24. Since the discrete branches 42 are selected according to the probability density function 45 of the sample objective function values 44 of the partitioning objective function 43, and since the partitioning objective function 43 reaches an extremal value when a failure event 54 occurs, the search space partitioning module 40 selects the discrete branches 42 in a manner that has an increased probability of sampling discrete branches 42 that end in failure events 54 rather than success events 58.

Returning to the example of FIG. 1, the processor 12 is further configured to execute a multi-agent system model 50 when performing the MCTS 30. The multi-agent system model 50 includes a plurality of supervised learning models 52. At the supervised learning models 52, the processor 12 is configured to recompute the estimated event probabilities 47 associated with the event nodes 46 included in the discrete branches 42.

The changes to the estimated event probabilities 47 encode the time evolution of the multi-agent system represented with the multi-agent system model 50. Over the course of the MCTS 30, the processor 12 is configured to perform a plurality of node visits 33 in which the multi-agent system model 50 computes the estimated event probabilities 47 for different discrete branches 42, and in which corresponding failure event probabilities 56 are used to steer the MCTS 30. By iteratively recomputing the estimated event probabilities 47 and using those estimated event probabilities 47 in a subsequent node visit 33, the MCTS 30 iteratively re-samples the discretized search space 24 over the plurality of node visits 33 in a manner that reflects the probabilistic time-evolution of the modeled multi-agent system. The multi-agent system model 50 is simulated at a plurality of simulated physical timesteps that do not necessarily correspond to the node visits 33, since the MCTS 30 can return to previously visited event nodes 46 during some node visits 33. In such repeat node visits 33, the processor 12 can reuse previously computed estimated event probabilities 47 generated at the multi-agent system model 50.

In some examples, the processor 12 is further configured to convert one or more discrete inputs 26 into a continuous input value prior to inputting that value into the multi-agent system model 50. In such examples, the processor 12 is configured to make the one or more discrete inputs 26 continuous by sampling the continuous values from respective estimated probability distributions associated with the input variables. By converting the discrete inputs 26 into continuous values, the processor 12 is configured to search over a wider variety of potential input values. The processor 12 is further configured to re-discretize the outputs of the multi-agent system model 50 such that those outputs match the discrete branches 42 computed for the current-iteration portion 28 of the discretized search space 24.

In a terminal node visit 33 of the plurality of node visits 33, the processor 12 is further configured to output an indication of an adversarial branch 60 of the discretized search space 24 that has a highest failure event probability 56. The processor 12 is further configured to generate a graphical representation 66 of the adversarial branch 60 and output the graphical representation 66 for display at the display device 18 as part of a graphical user interface (GUI) 62. The failure event probability 56 associated with the adversarial branch 60 is also included in the graphical representation 66 in some examples.

Figure 4A:
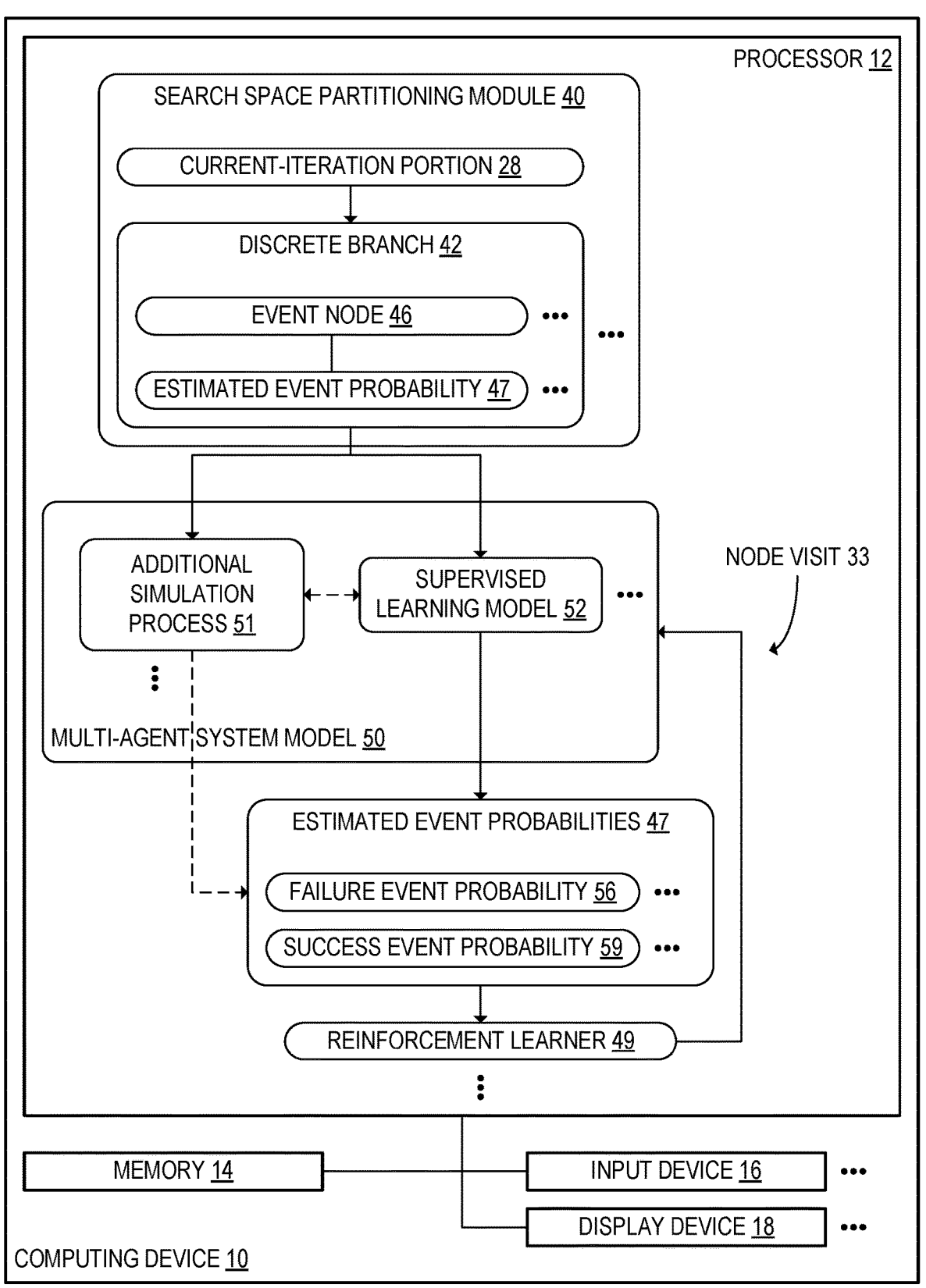
FIG. 4A schematically shows the computing device when a multi-agent system model is executed during inferencing, according to the example of FIG. 1.

FIG. 4A schematically shows the computing device 10 when the processor 12 executes the multi-agent system model 50 during inferencing. As shown in FIG. 4A, the supervised learning models 52 included in the multi-agent system model 50 are configured to receive the plurality of discrete branches 42 that are computed at the search space partitioning module 40 during the current partitioning step 32. At the multi-agent system model 50, the processor 12 is further configured to input the discrete branches 42 into the plurality of supervised learning models 52. Using the plurality of supervised learning models 52, the processor 12 is further configured to simulate the dynamics of a system that includes an aircraft to determine whether a failure event 54 occurs.

During a node visit 33, the processor 12 is further configured to backpropagate the failure event probabilities 56, as output by the supervised learning models 52, through the discrete branches 42 to recompute the estimated event probabilities 47 associated with the event nodes 46 located at higher levels of the tree structure 48. Thus, during each node visit 33, the processor 12 is configured to iteratively adjust the estimated event probabilities 47, working upward along the discrete branches 42 through the tree structure 48.

At the highest node of the tree structure 48, which represents the current-iteration portion 28 of the discretized search space 24, the processor 12 is further configured to recompute the current-iteration portion 28 based at least in part on the estimated event probabilities 47 of the event nodes 46 at the second-highest level (the event nodes 46 directly below the node representing the entire current-iteration portion 28). In some examples, the processor 12 selects, as the recomputed current-iteration portion 28, a region of the discretized search space 24 located around the discrete branch 42 of the plurality of discrete branches 42 that has a highest failure event probability 56. The region around the discrete branch 42 can be, for example, an n-rectangle centered on a location of the second-highest event node 46 in that discrete branch 42, where n is the number of dimensions of the discretized search space 24.

The multi-agent system model 50 depicted in FIG. 4A further includes one or more additional simulation processes 51 that are executed when simulating operation of the aircraft but do not make use of supervised learning. In some examples, the one or more additional simulation processes 51 include a physics engine configured to model dynamics of a physical system that includes the aircraft. For example, the processor 12 can perform aerodynamics simulations at the physics engine in such examples. As another example, the one or more additional simulation processes 51 can include a weather simulation process. Other types of additional simulation processes 51 are additionally or alternatively included in the multi-agent system model 50 in some examples.

The one or more additional simulation processes 51 are configured to pre-process inputs to the one or more supervised learning models 52 in some examples. For example, when the one or more additional simulation processes 51 include a weather simulation process, the multi-agent system model 50 may include a supervised learning model 52 configured to simulate a pilot's response to different weather conditions. The one or more additional simulation processes 51 can also post-process outputs of the plurality of supervised learning models 52, such as by simulating the response of aircraft control system 70 components to aircraft controller input.

Additionally or alternatively, the processor 12 is configured to use outputs of the one or more additional simulation processes 51 when computing the estimated event probabilities 47 without first passing those outputs through the plurality of supervised learning models 52. For example, output of a weather simulation process can be used to update a state of a simulated system including an aircraft, as indicated by the estimated event probabilities 47, independently of the effects of weather on the behavior of a pilot, an air traffic controller, or any other agent modeled using the plurality of supervised learning models 52.

Returning to the example of FIG. 1, the processor 12 is further configured to perform the MCTS 30 at least in part by executing one or more reinforcement learners 49. The one or more reinforcement learners 49 are configured to select discrete branches 42 that approximately maximize the failure event probabilities 56. Thus, the one or more reinforcement learners 49 are configured to adversarially perturb the simulated system. The adversarial branch 60 that is output by the MCTS 30 a discrete branch 42 selected by the one or more reinforcement learners 49 during a final node visit 33 of the plurality of node visits 33. In some examples, the one or more reinforcement learners 49 include a plurality of reinforcement learners 49 that respectively correspond to different types of failure events 54. In other examples, the one or more reinforcement learners 49 are instantiated as a single reinforcement learner 49.

In some examples, the one or more reinforcement learners 49 are configured to use Q-learning. In such examples, a reinforcement learner 49 is configured to compute a Q-score associated with the event node 46 visited in the current node visit 33. The Q-score is a measure of the expected reward associated with selecting that event node 46. Using this Q-score, the reinforcement learner 49 is configured to select a subsequent event node 46 to visit in a subsequent node visit 33. The subsequent event node 46 may be either above or below the current event node 46 in the tree structure 48. Thus, an event node 46 can be visited multiple times over the course of the MCTS 30. In some examples, the one or more reinforcement learners 49 also utilize novelty factors that provide additional reward associated with previously unvisited event nodes 46, thereby guiding the MCTS 30 toward previously unvisited regions of the current-iteration portion 28 of the search space 20.

The processor 12 can perform a plurality of node visits 33 within a specific instance of the current-iteration portion 28 of the search space 20. The current-iteration portion 28 of the search space is accordingly reused for a plurality of node visits 33 before being recomputed, thereby allowing the one or more reinforcement learners 49 to explore the current-iteration portion 28 before the processor 12 recomputes the discrete branches 42 at the search space partitioning module 40.

Figure 4B:
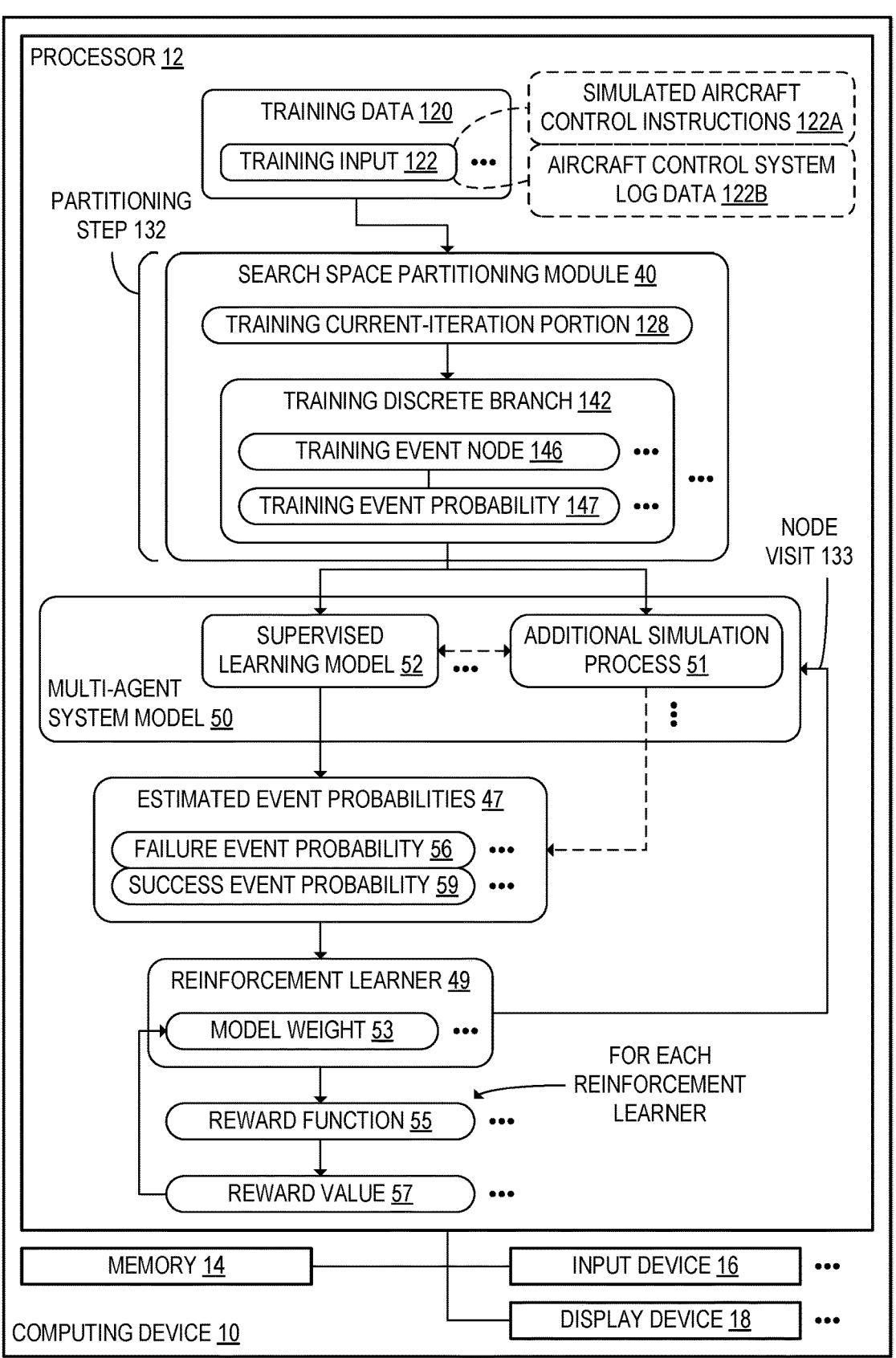
FIG. 4B schematically shows the computing device during training of one or more reinforcement learners, according to the example of FIG. 4A.

FIG. 4B schematically shows the computing device 10 in additional detail when the processor 12 is configured to train the one or more reinforcement learners 49. The one or more reinforcement learners 49 included in the MCTS 30 each have respective reward functions 55 that are evaluated in each of the node visits 33 performed during training. By evaluating the reward functions 55, the processor 12 is further configured to compute respective reward values 57 for the reinforcement learners 49 based at least in part on the failure event probabilities 56. The processor 12 is further configured to update respective model weights 53 of the reinforcement learners 49 based at least in part on the reward values 57. In this example, the one or more respective reward functions 55 of the one or more reinforcement learners 49 are configured to reinforce the selection of discrete branches 42 with higher failure event probabilities 56.

During training of the plurality of reinforcement learners 49, the processor 12 is configured to compute a plurality of training discrete branches 142 at the search space partitioning module 40. The training discrete branches 142 each include a plurality of training event nodes 146 that have corresponding training event probabilities 147. The training discrete branches 142 are computed using the same discretized search space 24 that is used when the MCTS 30 is performed during inferencing. Training is performed in a plurality of partitioning steps 132 in which the training discrete branches 142 are iteratively recomputed and used as inputs to the reinforcement learners 49. In addition, the training includes a plurality of node visits 133. In each of the partitioning steps 132 other than a final partitioning step 132, the estimated event probabilities 47 computed at the plurality of reinforcement learners 49 are used as the training event probabilities 147 in the subsequent partitioning steps 132.

The search space partitioning module 40 is configured to compute the plurality of training discrete branches 142 using training data 120 that includes a plurality of training inputs 122 to the aircraft control system 70. For example, the training inputs 122 can be simulated aircraft control instructions 122A received from a flight simulator application program, as discussed in further detail below. The plurality of training inputs 122 can additionally or alternatively include aircraft control system log data 122B, which includes historical inputs to the aircraft control system 70.

Figure 5A:
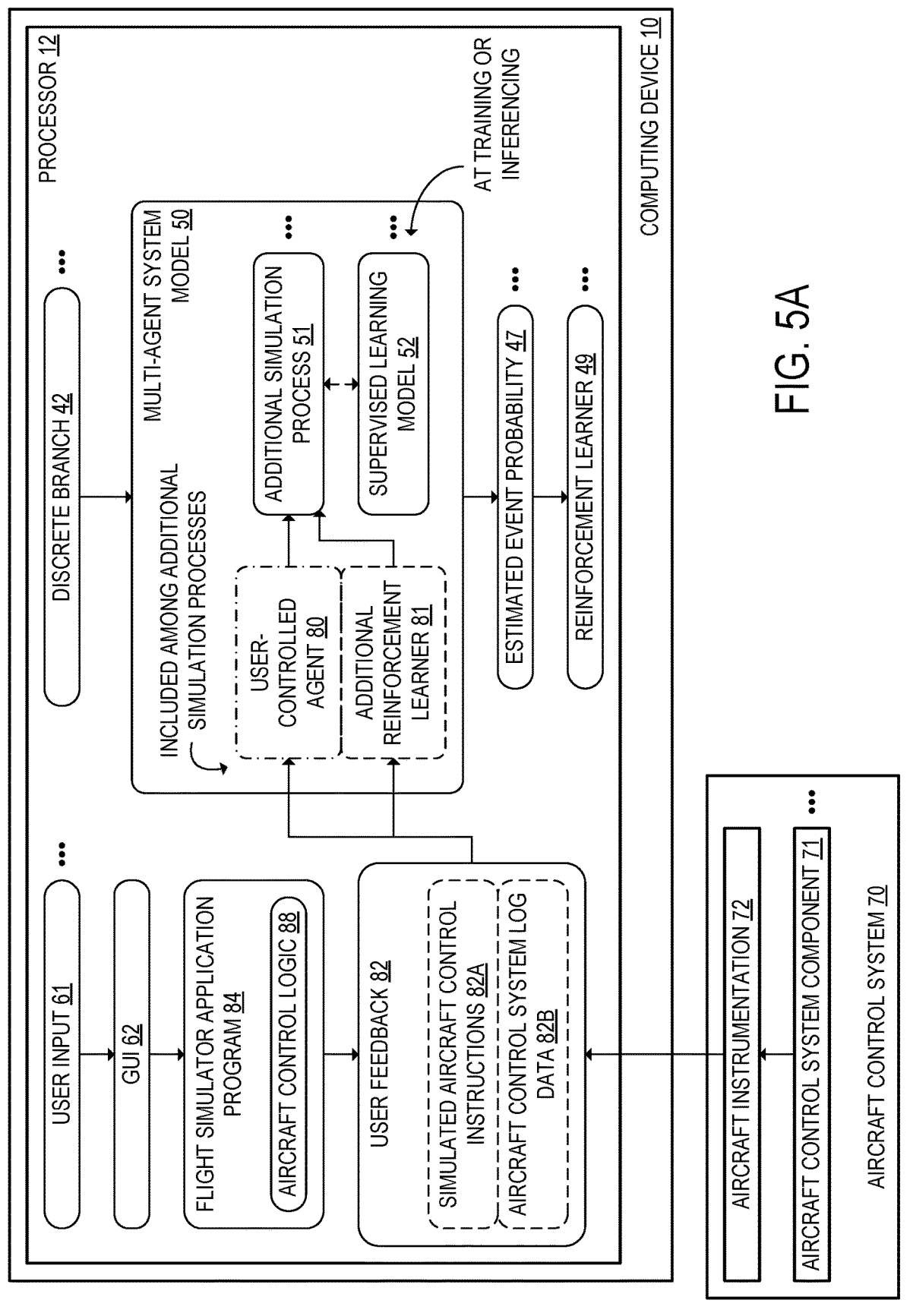
FIG. 5A schematically shows the computing system when user feedback is received at the multi-agent system model, according to the example of FIG. 1.

As discussed above, the multi-agent system model 50 includes one or more additional simulation processes 51 in some examples. In some such examples, as schematically depicted in FIG. 5A, the processor 12 is further configured to receive user feedback 82 via a user-controlled agent 80 included among the one or more additional simulation processes 51 in the multi-agent system model 50. In some examples, the user feedback 82 received at the user-controlled agent 80 includes simulated aircraft control instructions 82A. The simulated aircraft control instructions 82A, in such examples, are received from a flight simulator application program 84 in response to user inputs 61 and aircraft control logic 88. In such examples, the flight simulator application program 84 receives the user input 61 via the GUI 62. The flight simulator application program 84 is further configured to display the graphical representation 66 of the adversarial branch 60 at the GUI 62, as discussed in further detail below.

In some examples, the one or more additional simulation processes 51 further include an additional reinforcement learner 81. In such examples, the additional reinforcement learner 81 is configured to receive the user feedback 82. The additional reinforcement learner 81 is further configured to adjust one or more parameters of the multi-agent system model 50 according to the user feedback 82 and a policy function learned through reinforcement learning. For example, the additional reinforcement learner 81 can be configured to perform dynamic difficulty adjustment for training scenarios presented to an aircraft operator undergoing training at the flight simulator application program 84. In this example, the reward received by the additional reinforcement learner 81 is computed based at least in part on a success rate of the aircraft operator at the training scenarios. The additional reinforcement learner 81 can be trained via unsupervised learning on samples of user interaction with the flight simulator application program 84.

In other examples, the user feedback 82 includes aircraft control system log data 82B received from the aircraft control system 70. In such examples, the aircraft control system 70 includes aircraft instrumentation 72 configured to collect, store, and output log data associated with aircraft control system components 71 included in the aircraft control system 70. The aircraft control system log data 82B accordingly indicates respective states of the aircraft control system components 71 at specific points in time.

In some examples, one or more of the plurality of supervised learning models 52 are trained to model the behavior of human actors such as a pilot or an air traffic controller. For example, the plurality of supervised learning models 52 can include an imitation learner trained to imitate behavior of an operator of the aircraft control system 70. In some such examples, the imitation learner is trained via inverse Q-learning. Additionally or alternatively to an imitation learner trained to imitate the behavior of a human operator, the multi-agent system model 50 can include one or more supervised learning models 52 configured to imitate the behavior of one or more other machine learning models, such as one or more machine-learning-based automated controllers included in the aircraft control system 70.

The processor 12 can receive the user feedback 82 as training or inferencing input to the multi-agent system model 50. In some examples in which the user feedback 82 is received as training data with which the one or more supervised learning models 52 are trained, the processor 12 is configured to utilize the user feedback 82 at each of the node visits 33. For example, the user feedback 82 can be received as real-time user input to the flight simulator application program 84 with which the plurality of supervised learning models 52 are trained via online learning. In other examples, the processor 12 receives the user feedback 82 and trains the supervised learning models 52 in an asynchronous manner.

Figure 5B:
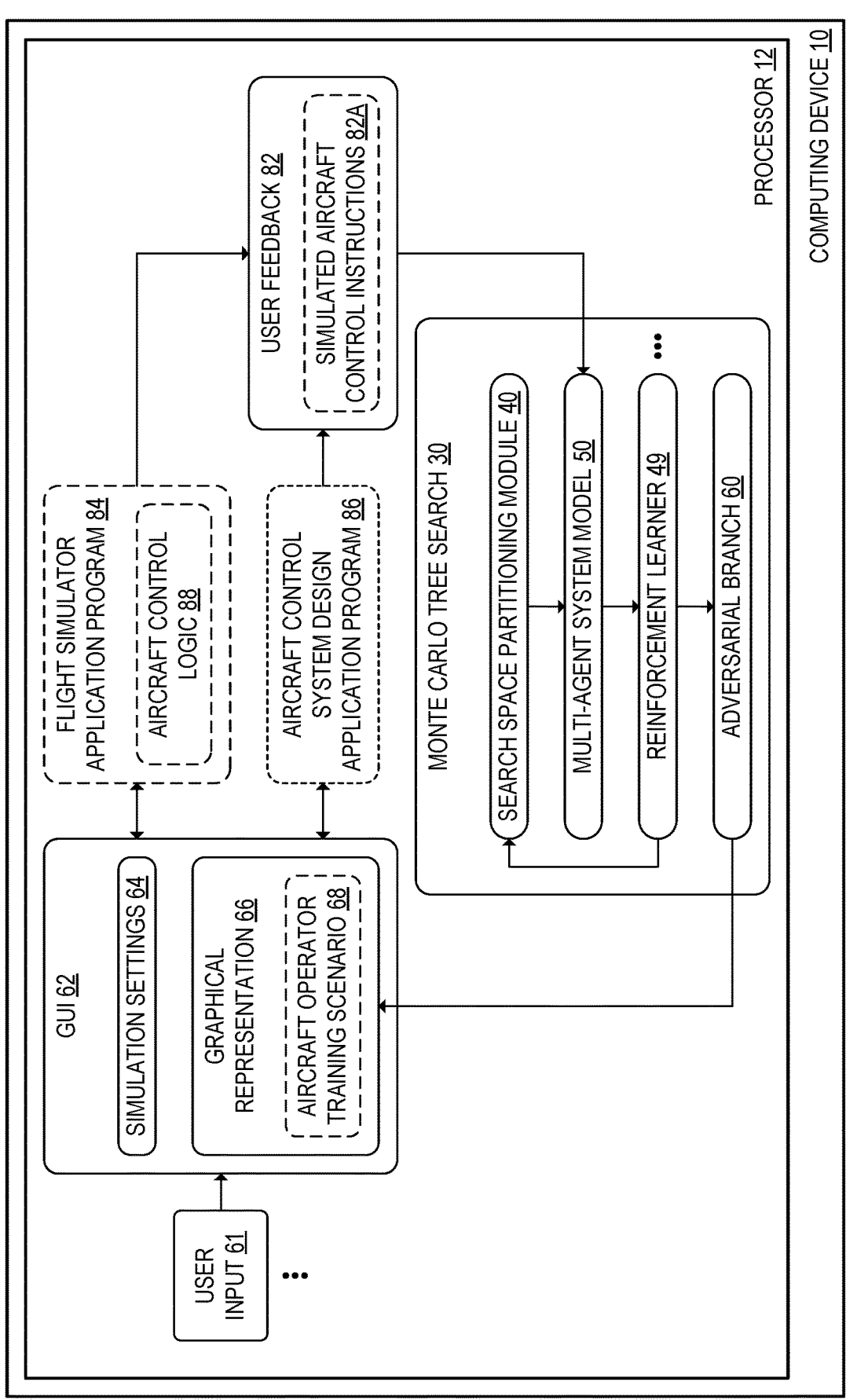
FIG. 5B schematically shows the computing system when a graphical representation of an adversarial branch of the search space is output to a graphical user interface, according to the example of FIG. 5A.

When the processor 12 receives user feedback 82 during inferencing, the processor 12 is configured to iteratively perform the MCTS 30 and identify adversarial branches 60 of the discretized search space 24 while receiving the user feedback 82, as depicted in the example of FIG. 5B. In the example of FIG. 5B, the graphical representation 66 of the adversarial branch 60 includes an aircraft operator training scenario 68 presented via the flight simulator application program 84. As a user of the flight simulator application program 84 inputs user feedback 82 into the flight simulator application program 84 via the GUI 62, the processor 12 is configured to compute adversarial branches 60 via the MCTS 30 at corresponding states of the aircraft operator training scenario 68. The processor 12 is accordingly configured to iteratively update the aircraft operator training scenario 68 as the user interacts with the flight simulator application program 84. In examples in which the multi-agent system model 50 includes an additional reinforcement learner 81, as discussed above with reference to FIG. 5A, the additional reinforcement learner 81 can also be used to iteratively update the aircraft operator training scenario 68 in response to the user feedback 82.

In some examples in which the processor 12 is configured to discretize one or more continuous-valued input variables to thereby compute a discretized search space 24, the processor 12 is further configured to map one or more discrete values of those one or more variables back to a continuous range subsequently to computing the adversarial branch 60. In such examples, this mapping is performed on values of the one or more discretized inputs 26 specified by the adversarial branch 60. The processor 12 can, for example, stochastically select one or more continuous variable values from within one or more corresponding discrete ranges. Thus, the processor 12 is configured to increase variety among the adversarial scenarios presented to the user.

In other examples, rather than displaying the graphical representation 66 at a flight simulator application program 84, the processor 12 is configured to display the graphical representation 66 at the GUI 62 via an aircraft control system design application program 86. In such examples, the user feedback 82 can include modifications to a structural configuration of the aircraft control system 70, as well as the simulated aircraft control instructions 82A.

Returning to the example of FIG. 1, when the user interacts with the multi-agent system model 50 via the GUI 62, the processor 12 is configured to receive simulation settings 64 indicated by the user input 61. For example, the simulation settings 64 can include a definition of the search space 20 or an input range bucketing size used to compute the discretized search space 24. Additionally or alternatively, the simulation settings 64 include one or more initial values of the estimated event probabilities 47 in some examples. One or more parameters of the multi-agent system model 50, such as a selection of one or more supervised learning models 52 from among a plurality of trained supervised learning models 52 for inclusion in the multi-agent system model 50, are also included in the simulation settings 64 in some examples.

Via user input 61 to the GUI 62, the user can also pause the multi-agent system model 50. The user can then update the simulation settings 64 while the multi-agent system model 50 is paused. Accordingly, the GUI 62 is configured to allow the user to modify and resume the MCTS 30 during execution, such as to steer the search toward a particular type of scenario that the user wishes to model. In some examples, the processor 12 is further configured to store the state of the MCTS 30 in the memory 14 for later use, copying, and/or transmission to another computing device.

FIG. 6A schematically shows a flowchart of a method 200 for use with a computing device to estimate the probabilities of failure events and identify sequences of events according to which it is possible for those failure events to occur. At step 202, the method 200 includes receiving a specification of a search space over a plurality of inputs to an aircraft control system. The inputs to the aircraft control system include variables that are directly or indirectly controllable by an aircraft operator. These inputs include discrete and/or continuous variables. In examples in which the inputs include one or more continuous variables, the method 200 further includes, at step 204, discretizing one or more of the plurality of inputs to the aircraft control system.

At step 206, the method 200 further includes performing an MCTS to identify an adversarial branch of the search space. The MCTS includes computing a plurality of branches of the discretized search space over a plurality of partitioning steps. In addition, the MCTS includes performing a plurality of node visits to search over the discrete branches. The adversarial branch is a discrete branch of the discretized search space that has a highest failure event probability among the plurality of discrete branches computed in the plurality of node visits 33. In some examples, the failure event is a collision between two aircraft, a collision between an aircraft and ground, or an aircraft component malfunction. Other types of failure events are also considered in some examples. In some examples, at step 208, performing the MCTS at step 206 includes executing one or more reinforcement learners when the node visits are performed.

FIG. 6B shows additional steps of the method 200 that are performed during the MCTS. The steps shown in FIG. 6B are computed in each of the tree search iterations. At step 214, the method 200 further includes computing a plurality of discrete branches of the search space. Computing the discrete branches at step 214 includes, at step 216, computing a plurality of sample objective function values of a partitioning objective function for different respective sample input values of the inputs included in a current-iteration portion of the search space. The sample input values are, for example, sampled randomly or pseudo-randomly from within the current-iteration portion. The partitioning objective function is, for example, selected according to one or more types of failure events for which the respective failure event probabilities are estimated. In some examples, the partitioning objective function has an extremal value when a failure event is identified as occurring.

At step 218, step 214 further includes estimating a probability density function of the partitioning objective function over the current-iteration portion of the search space based at least in part on the sample objective function values. At step 220, step 212 further includes partitioning the current-iteration portion of the search space into the discrete branches based at least in part on the probability density function. The current-iteration portion of the search space is partitioned such that the discrete branches each include a respective sequence of event nodes that have corresponding estimated event probabilities. The discrete branches form a tree structure in which each failure event is positioned as a leaf node. The plurality of event probabilities include a plurality of failure event probabilities of a respective plurality of failure events, as well as a plurality of success event probabilities of a respective plurality of success events, where the success events are indicated by leaf nodes that are not failure events.

Subsequently to computing the plurality of discrete branches, performing the MCTS further includes, at step 222, recomputing the estimated event probabilities associated with each of a plurality of event nodes included in the discrete branches. The estimated event probabilities are recomputed at a multi-agent system model that includes a plurality of supervised learners. These supervised learners have been trained to simulate the behavior of personnel and/or automated control systems involved in aircraft operation. In some examples, the plurality of supervised learners include an imitation learner trained to imitate behavior of an operator of the aircraft control system. The multi-agent system model, in some examples, further includes one or more additional simulation processes that perform dynamical modeling without making use of supervised learning. The one or more additional simulation processes include a physics engine in some examples. Additionally or alternatively, the one or more additional simulation processes can include an additional reinforcement learner that is trained with unsupervised learning. The one or more additional simulation processes are, for example, used to pre-process inputs to, or post-process outputs of, the plurality of supervised learners.

At step 224, performing the MCTS further includes recomputing the current-iteration portion of the search space based at least in part on the failure event probabilities. For example, a region of the current-iteration portion around the discrete branch with the highest failure probability can be used as the current-iteration portion in a subsequent search iteration. The current-iteration portion of the search space is therefore iteratively narrowed over the plurality of partitioning.

Returning to FIG. 6A, subsequently to performing the MCTS at step 206, the method 200 further includes, at step 210, generating a graphical representation of the adversarial branch. The method 200 further includes, at step 212, outputting the graphical representation for display at a display device. In some examples, the graphical representation includes an aircraft operator training scenario presented via a flight simulator application program displayed at a GUI. In other examples, the graphical representation is displayed at an aircraft control system design interface.

FIG. 6C shows additional steps of the method 200 that are performed in some examples. At step 226, the method 200 further includes training the one or more reinforcement learners. The one or more reinforcement learners are trained over a plurality of training partitioning steps. Subsequently to each of the training partitioning steps, one or more training node visits are performed. In the example of FIG. 6C, training the one or more reinforcement learners at step 226 includes, at step 228, computing respective reward values of the reinforcement learners based at least in part on the respective failure event probabilities estimated for the failure events in the discrete branches at a current training node visit. At step 230, step 226 further includes modifying respective model weights of the one or more reinforcement learners based at least in part on the reward values.

FIG. 6D shows additional steps of the method 200 that are performed in some examples. At step 232, the method 200 further includes receiving user feedback via a user-controlled agent included in the multi-agent system model. This user-controlled agent, in such examples, is included among the one or more additional simulation processes. The user feedback, in some examples, includes simulated aircraft control instructions received from a flight simulator application program in response to user inputs and aircraft control logic. In other examples, the user feedback includes aircraft control system log data received from the aircraft control system of a physical aircraft.

At step 234, the method 200 further includes updating the plurality of discrete branches based at least in part on the user feedback. In some examples, the user feedback is used as additional training data to perform further training at the one or more reinforcement learners and/or the plurality of supervised learners. In examples in which the user feedback includes simulated aircraft control instructions received from the flight simulator application program, the simulated aircraft control instructions can be used as real-time feedback provided to the multi-agent system model.

Using the devices and methods discussed above, a Monte Carlo tree search is used to identify failure events that have the potential to occur during aircraft operation. Since conventional MCTS techniques are unlikely to detect very low-probability (but potentially very costly) failure events, the devices and methods discussed above perform branching in a manner that focuses the search on search space regions in which failure events have high probabilities relative to other regions.

The devices and methods discussed above also perform the MCTS in a manner that allows for modeling of complex multi-agent systems. By incorporating multiple machine learning models into the system model that is used to simulate aircraft operation, the above devices and methods allow failure events to be predicted in scenarios that involve multiple human or AI actors. Accordingly, failure events involving operator error can be predicted more accurately. The structure of the multi-agent system model discussed above also allows for the incorporation of live feedback into the multi-agent system model. This live feedback is usable to provide further training data for the reinforcement learners and/or supervised learners, which will steer the execution of emergency drills or training exercises.

Although the above devices and methods are discussed with reference to modeling an aircraft control system, the above techniques are also applicable to other settings in which low-probability but high-cost failure events can occur. For example, the techniques discussed above can also be used for modeling failure event risks in nuclear power generation, pathogen research, or high-capability AI model development.

The methods and processes described herein can be tied to a computing system of one or more computing devices. In particular, such methods and processes can be implemented as an executable computer-application program, a network-accessible computing service, an application-programming interface (API), a library, or a combination of the above and/or other compute resources.

Figure 7:
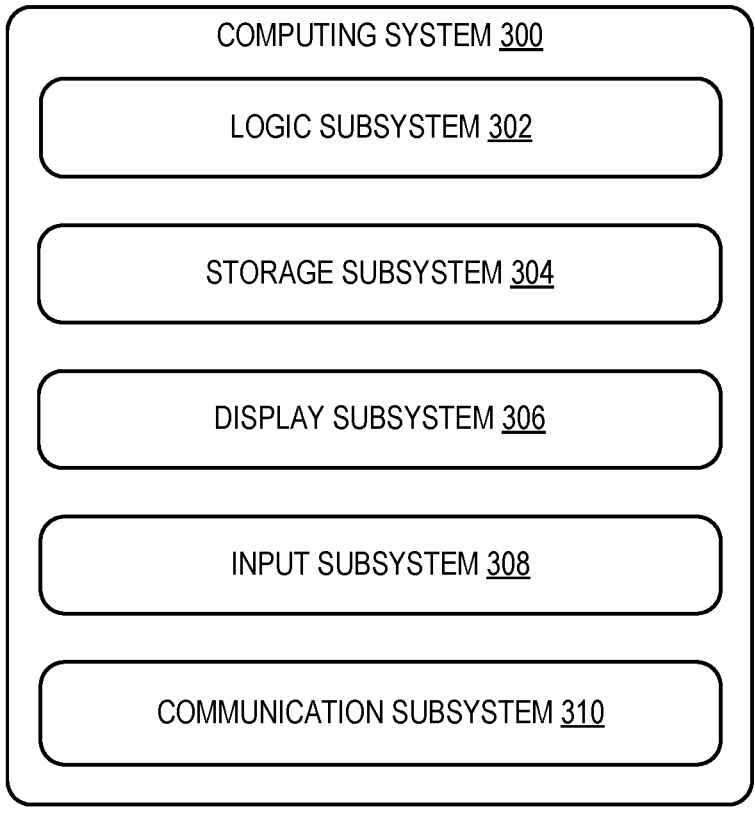
FIG. 7 schematically shows a computing system in which the computing device of FIG. 1 is instantiated in some examples.

FIG. 7 schematically shows a simplified representation of a computing system 300 configured to provide any to all of the computing functionality described herein. Computing system 300 can take the form of one or more network-accessible devices, server computers, mobile computing devices, Internet of Things (IoT) devices, embedded computing devices, vehicle computing systems, vehicle guidance systems, and/or other computing devices.

Computing system 300 includes a logic subsystem 302 and a storage subsystem 304. Computing system 300 can optionally include a display subsystem 306, input subsystem 308, communication subsystem 310, and/or other subsystems not shown in FIG. 7.

Logic subsystem 302 includes one or more physical devices configured to execute instructions. For example, the logic subsystem can be configured to execute instructions that are part of one or more applications, services, or other logical constructs. The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 304 includes one or more physical devices configured to temporarily and/or permanently hold computer information such as data and instructions executable by the logic subsystem. When the storage subsystem includes two or more devices, the devices can be collocated and/or remotely located. Storage subsystem 304 can include volatile, nonvolatile, dynamic, static, read/write, read-only, random-access, sequential-access, location-addressable, file-addressable, and/or content-addressable devices. Storage subsystem 304 can include removable and/or built-in devices. When the logic subsystem executes instructions, the state of storage subsystem 304 can be transformed—e.g., to hold different data.

Aspects of logic subsystem 302 and storage subsystem 304 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem 302 and the storage subsystem 304 can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

When included, display subsystem 306 can be used to present a visual representation of data held by storage subsystem 304. This visual representation can take the form of a graphical user interface (GUI). Display subsystem 306 can include one or more display devices utilizing virtually any type of technology. In some implementations, display subsystem can include one or more virtual-, augmented-, or mixed reality displays.

When included, input subsystem 308 can comprise or interface with one or more input devices. An input device can include a sensor device or a user input device. Examples of user input devices include a keyboard, mouse, or touch screen. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 310 can be configured to communicatively couple computing system 300 with one or more other computing devices. Communication subsystem 310 can include wired and/or wireless communication devices compatible with one or more different communication protocols. The communication subsystem can be configured for communication via personal-, local- and/or wide-area networks.

Further, the disclosure comprises configurations according to the following clauses.

Clause 1. A computing device comprising: a processor configured to: receive a specification of a search space over a plurality of inputs to an aircraft control system; perform a Monte Carlo tree search (MCTS) to identify an adversarial branch of the search space, wherein performing the MCTS includes, in each of a plurality of partitioning steps: computing a plurality of discrete branches of the search space at least in part by: computing a plurality of sample objective function values of a partitioning objective function for different respective sample input values of the inputs included in a current-iteration portion of the search space; estimating a probability density function of the partitioning objective function over the current-iteration portion of the search space based at least in part on the sample objective function values; and partitioning the current-iteration portion of the search space into the discrete branches based at least in part on the probability density function, wherein: the discrete branches each include a respective sequence of event nodes that have corresponding estimated event probabilities; and the plurality of event probabilities include a plurality of failure event probabilities of a respective plurality of failure events; at a multi-agent system model that includes a plurality of supervised learning models, recomputing the estimated event probabilities associated with each of a plurality of event nodes included in the discrete branches; and recomputing the current-iteration portion of the search space based at least in part on the failure event probabilities; generate a graphical representation of the adversarial branch; and output the graphical representation for display at a display device.

Clause 2. The computing device of Clause 1, wherein the processor is further configured to perform the MCTS at least in part by executing one or more reinforcement learners.

Clause 3. The computing device of Clause 2, wherein the processor is further configured to train the one or more reinforcement learners at least in part by: computing respective reward values of the one or more reinforcement learners based at least in part on the respective failure event probabilities estimated for the failure events in the discrete branches; and modifying respective model weights of the one or more reinforcement learners based at least in part on the reward values.

Clause 4. The computing device of any of Clauses 1-3, wherein the processor is further configured to: receive user feedback via a user-controlled agent included in the multi-agent system model; and update the plurality of discrete branches based at least in part on the user feedback.

Clause 5. The computing device of Clause 4, wherein the user feedback includes simulated aircraft control instructions received from a flight simulator application program in response to user inputs and aircraft control logic.

Clause 6. The computing device of Clause 5, wherein the graphical representation includes an aircraft operator training scenario presented via the flight simulator application program.

Clause 7. The computing device of any of Clauses 4-6, wherein the user feedback includes aircraft control system log data received from the aircraft control system.

Clause 8. The computing device of any of Clauses 4-7, wherein the processor receives the user feedback as training data with which the one or more supervised learning models are trained.

Clause 9. The computing device of any of Clauses 1-8, wherein the plurality of supervised learning models include an imitation learner trained to imitate behavior of an operator of the aircraft control system.

Clause 10. The computing device of any of Clauses 1-9, wherein computing the plurality of discrete branches further includes discretizing one or more of the plurality of inputs to the aircraft control system.

Clause 11. The computing device of any of Clauses 1-10, wherein the adversarial branch has a highest failure event probability among the plurality of discrete branches computed in the plurality of partitioning steps.

Clause 12. The computing device of any of Clauses 1-11, wherein the plurality of failure events are each selected from the group consisting of: a collision between two aircraft; a collision between an aircraft and ground; an aircraft component malfunction; an aircraft destabilization; loss of control over the aircraft; aircraft stalling; a hard landing; and a runway excursion.

Clause 13. A method for use with a computing device, the method comprising: receiving a specification of a search space over a plurality of inputs to an aircraft control system; performing a Monte Carlo tree search (MCTS) to identify an adversarial branch of the search space, wherein performing the MCTS includes, in each of a plurality of partitioning steps: computing a plurality of discrete branches of the search space at least in part by: computing a plurality of sample objective function values of a partitioning objective function for different respective sample input values of the inputs included in a current-iteration portion of the search space; estimating a probability density function of the partitioning objective function over the current-iteration portion of the search space based at least in part on the sample objective function values; and partitioning the current-iteration portion of the search space into the discrete branches based at least in part on the probability density function, wherein: the discrete branches each include a respective sequence of event nodes that have corresponding estimated event probabilities; and the plurality of event probabilities include a plurality of failure event probabilities of a respective plurality of failure events; at a multi-agent system model that includes a plurality of supervised learning models, recomputing the estimated event probabilities associated with each of a plurality of event nodes included in the discrete branches; and recomputing the current-iteration portion of the search space based at least in part on the failure event probabilities; generating a graphical representation of the adversarial branch; and outputting the graphical representation for display at a display device.

Clause 14. The method of Clause 13, wherein performing the MCTS includes executing one or more reinforcement learners.

Clause 15. The method of Clause 14, further comprising training the one or more reinforcement learners at least in part by: computing respective reward values of the one or more reinforcement learners based at least in part on the respective failure event probabilities estimated for the failure events in the discrete branches; and modifying respective model weights of the one or more reinforcement learners based at least in part on the reward values.

Clause 16. The method of any of Clauses 13-15, further comprising: receiving user feedback via a user-controlled agent included in the multi-agent system model; and updating the plurality of discrete branches based at least in part on the user feedback.

Clause 17. The method of Clause 16, wherein the user feedback includes simulated aircraft control instructions received from a flight simulator application program in response to user inputs and aircraft control logic.

Clause 18. The method of Clause 16 or 17, wherein the user feedback includes aircraft control system log data received from the aircraft control system.

Clause 19. The method of any of Clauses 13-18, wherein the plurality of failure events are each selected from the group consisting of: a collision between two aircraft; a collision between an aircraft and ground; an aircraft component malfunction; an aircraft destabilization; loss of control over the aircraft; aircraft stalling; a hard landing; and a runway excursion.

Clause 20. A computing device comprising: a processor configured to: receive a specification of a search space over a plurality of inputs; discretize one or more of the plurality of inputs; perform a Monte Carlo tree search (MCTS) to identify an adversarial branch of the search space, wherein: the adversarial branch has a highest failure event probability among the plurality of discrete branches computed in a plurality of partitioning steps; and performing the MCTS includes, in each of the plurality of partitioning steps: computing a plurality of discrete branches of the search space at least in part by: computing a plurality of sample objective function values of a partitioning objective function for different respective sample input values of the inputs included in a current-iteration portion of the search space; estimating a probability density function of the partitioning objective function over the current-iteration portion of the search space based at least in part on the sample objective function values; and partitioning the current-iteration portion of the search space into the discrete branches based at least in part on the probability density function, wherein: the discrete branches each include a respective sequence of event nodes that have corresponding estimated event probabilities; and the plurality of event probabilities include a plurality of failure event probabilities of a respective plurality of failure events; at a multi-agent system model that includes a plurality of supervised learning models, recomputing the estimated event probabilities associated with each of a plurality of event nodes included in the discrete branches; and recomputing the current-iteration portion of the search space based at least in part on the failure event probabilities; and output an indication of the adversarial branch.

"And/or" as used herein is defined as the inclusive or $\lor$, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system of one or more computing devices comprising:
one or more processing devices configured to:
receive a specification of a search space over a plurality of inputs to an aircraft control system;

perform a Monte Carlo tree search (MCTS) to identify an adversarial branch of the search space, wherein performing the MCTS includes, in each of a plurality of partitioning steps:

computing a plurality of discrete branches of the search space at least in part by:

computing a plurality of sample objective function values of a partitioning objective function for different respective sample input values of the inputs included in a current-iteration portion of the search space;

estimating a probability density function of the partitioning objective function over the current-iteration portion of the search space based at least in part on the sample objective function values; and partitioning the current-iteration portion of the search space into the discrete branches based at least in part on the probability density function, wherein:

the discrete branches each include a respective temporal sequence of event nodes that indicate a plurality of temporally ordered events and have corresponding estimated event probabilities; and the plurality of event probabilities include a plurality of failure event probabilities of a respective plurality of failure events;

at a multi-agent system model that includes a plurality of supervised learning models, recomputing the estimated event probabilities associated with each of a plurality of event nodes included in the discrete branches; and recomputing the current-iteration portion of the search space based at least in part on the failure event probabilities;

generate a graphical representation of the adversarial branch, wherein the graphical representation includes an aircraft operator training scenario presented via a flight simulator application program;

output the graphical representation for display at a display device;

receive user feedback via a user-controlled agent included in the multi-agent system model, wherein the user feedback includes simulated aircraft control instructions received from the flight simulator application program in response to user inputs and aircraft control logic; and update the plurality of discrete branches based at least in part on the user feedback.

2. The computing system of claim 1, wherein the one or more processing devices are further configured to perform the MCTS at least in part by executing one or more reinforcement learners.

3. The computing system of claim 2, wherein the one or more processing devices are further configured to train the one or more reinforcement learners at least in part by:

computing respective reward values of the one or more reinforcement learners based at least in part on the respective failure event probabilities estimated for the failure events in the discrete branches; and modifying respective model weights of the one or more reinforcement learners based at least in part on the reward values.

4. The computing system of claim 1, wherein the user feedback includes aircraft control system log data received from the aircraft control system.

5. The computing system of claim 1, wherein the one or more processing devices are further configured to receive the user feedback as training data with which the one or more supervised learning models are trained.

6. The computing system of claim 1, wherein the plurality of supervised learning models include an imitation learner trained to imitate behavior of an operator of the aircraft control system.

7. The computing system of claim 1, wherein computing the plurality of discrete branches further includes discretizing one or more of the plurality of inputs to the aircraft control system.

8. The computing system of claim 1, wherein the adversarial branch has a highest failure event probability among the plurality of discrete branches computed in the plurality of partitioning steps.

9. The computing system of claim 1, wherein the plurality of failure events are each selected from the group consisting of:

a collision between two aircraft;

a collision between an aircraft and ground;

an aircraft component malfunction;

an aircraft destabilization;

loss of control over the aircraft;

aircraft stalling;

a hard landing; and a runway excursion.

10. A method for use with a computing device, the method comprising:

receiving a specification of a search space over a plurality of inputs to an aircraft control system;

performing a Monte Carlo tree search (MCTS) to identify an adversarial branch of the search space, wherein performing the MCTS includes, in each of a plurality of partitioning steps:

computing a plurality of discrete branches of the search space at least in part by:

computing a plurality of sample objective function values of a partitioning objective function for different respective sample input values of the inputs included in a current-iteration portion of the search space;

estimating a probability density function of the partitioning objective function over the current-iteration portion of the search space based at least in part on the sample objective function values; and partitioning the current-iteration portion of the search space into the discrete branches based at least in part on the probability density function, wherein:

the discrete branches each include a respective temporal sequence of event nodes that indicate a plurality of temporally ordered events and have corresponding estimated event probabilities; and the plurality of event probabilities include a plurality of failure event probabilities of a respective plurality of failure events;

at a multi-agent system model that includes a plurality of supervised learning models, recomputing the estimated event probabilities associated with each of a plurality of event nodes included in the discrete branches; and recomputing the current-iteration portion of the search space based at least in part on the failure event probabilities;

generating a graphical representation of the adversarial branch, wherein the graphical representation includes an aircraft operator training scenario presented via a flight simulator application program;

outputting the graphical representation for display at a display device;

receiving user feedback via a user-controlled agent included in the multi-agent system model, wherein the user feedback includes simulated aircraft control instructions received from the flight simulator application program in response to user inputs and aircraft control logic; and updating the plurality of discrete branches based at least in part on the user feedback.

11. The method of claim 10, wherein performing the MCTS includes executing one or more reinforcement learners.

12. The method of claim 11, further comprising training the one or more reinforcement learners at least in part by:

computing respective reward values of the one or more reinforcement learners based at least in part on the respective failure event probabilities estimated for the failure events in the discrete branches; and modifying respective model weights of the one or more reinforcement learners based at least in part on the reward values.

13. The method of claim 10, wherein the user feedback includes aircraft control system log data received from the aircraft control system.

14. The method of claim 10, wherein the plurality of failure events are each selected from the group consisting of:

a collision between two aircraft;

a collision between an aircraft and ground;

an aircraft component malfunction;

an aircraft destabilization;

loss of control over the aircraft;

aircraft stalling;

a hard landing; and a runway excursion.

15. A computing system of one or more computing devices comprising:

one or more processing devices configured to:

receive a specification of a search space over a plurality of inputs to an aircraft control system;

discretize one or more of the plurality of inputs;

perform a Monte Carlo tree search (MCTS) to identify an adversarial branch of the search space, wherein:

the adversarial branch has a highest failure event probability among a plurality of discrete branches computed in a plurality of partitioning steps; and performing the MCTS includes, in each of the plurality of partitioning steps:

computing the discrete branches of the search space at least in part by:

computing a plurality of sample objective function values of a partitioning objective function for different respective sample input values of the inputs included in a current-iteration portion of the search space;

estimating a probability density function of the partitioning objective function over the current-iteration portion of the search space based at least in part on the sample objective function values; and partitioning the current-iteration portion of the search space into the discrete branches based at least in part on the probability density function, wherein:

the discrete branches each include a respective temporal sequence of event nodes that indicate a plurality of temporally ordered events and have corresponding estimated event probabilities; and the plurality of event probabilities include a plurality of failure event probabilities of a respective plurality of failure events;

at a multi-agent system model that includes a plurality of supervised learning models, recomputing the estimated event probabilities associated with each of a plurality of event nodes included in the discrete branches; and recomputing the current-iteration portion of the search space based at least in part on the failure event probabilities;

output a graphical representation of the adversarial branch, wherein the graphical representation includes an aircraft operator training scenario presented via a flight simulator application program;

output the graphical representation for display at a display device;

receive user feedback via a user-controlled agent included in the multi-agent system model, wherein the user feedback includes simulated aircraft control instructions received from the flight simulator application program in response to user inputs and aircraft control logic; and update the plurality of discrete branches based at least in part on the user feedback.

16. The computing system of claim 15, wherein the one or more processing devices are further configured to perform the MCTS at least in part by executing one or more reinforcement learners.

17. The computing system of claim 16, wherein the one or more processing devices are further configured to train the one or more reinforcement learners at least in part by:

computing respective reward values of the one or more reinforcement learners based at least in part on the respective failure event probabilities estimated for the failure events in the discrete branches; and modifying respective model weights of the one or more reinforcement learners based at least in part on the reward values.

18. The computing system of claim 15, wherein the user feedback includes aircraft control system log data received from the aircraft control system.

19. The computing system of claim 15, wherein the one or more processing devices are further configured to receive the user feedback as training data with which the one or more supervised learning models are trained.

20. The computing system of claim 15, wherein the plurality of supervised learning models include an imitation learner trained to imitate behavior of an operator of the aircraft control system.

* * * * *